May 27, 1969

H. O. SCHERENBERG 3,446,313

APPARATUS FOR PREVENTING THE INLET VALVE WEAR OF SUPERCHARGED
INTERNAL COMBUSTION ENGINES
Filed Feb. 25, 1966

INVENTOR
HANS O. SCHERENBERG

BY *Dicke + Craig*

ATTORNEYS

United States Patent Office 3,446,313
Patented May 27, 1969

3,446,313
APPARATUS FOR PREVENTING THE INLET VALVE WEAR OF SUPERCHARGED INTERNAL COMBUSTION ENGINES
Hans O. Scherenberg, Stuttgart-Heumaden, Germany, assignor to Daimler-Benz Aktiengesellschaft, Stuttgart-Unterturkheim, Germany
Filed Feb. 25, 1966, Ser. No. 530,229
Claims priority, application Germany, Feb. 25, 1965,
D 46,606
Int. Cl. F01m 1/08
U.S. Cl. 184—6
21 Claims

ABSTRACT OF THE DISCLOSURE

A poppet valve for a supercharged internal combustion engine provided with means to directly lubricate the inlet valve seat independently of the inlet charge. The lubricant may be sprayed on to the valve seat surfaces, or delivered thereto by means of bores communicating with an annular channel, or a single opening in combination with a rotatable valve, for example. The supercharger drive and lubricant pump with its drive may be provided in a separate chamber of the internal combustion engine.

Background of the invention

With supercharged internal combustion engines, in contrast to suction engines, an excess pressure prevails constantly in the air channel or duct leading to the inlet valve. The air seeks to escape through the valve guide means into the rocker arm space and prevents that oil, even with a completely enclosed rocker arm space, reaches in the opposite direction into the air inlet channel or duct and onto the valve seating surfaces. An unusually large valve wear is the result thereof at the inlet valves of such engines.

Summary of the invention

The present invention eliminates this drawback. It essentially consists in that during operation one coats or covers the inlet valve seating surfaces of the supercharged engines with a lubricant film continuously renewing itself in that one either sprays the lubricant on the valve seating surfaces or causes the lubricant to leave, preferably under pressure, through lubricant channels terminating in or at these valve seats. The spraying can be realized by spray nozzles provided within the area of the valve seats. The supply through channels takes place at the valve or at the valve-seat-ring, and more particularly either by way of an annular groove or by way of a series of apertures arranged in annular shape and replacing the groove. In the alternative, one many also supply the lubricant to a single place and at the same time take care for a rotation of the valve during its opening and/or closing movement.

Accordingly, it is an object of the present invention to provide a lubricating system for lubricating the valve seats of supercharged internal combustion engines which avoids by extremely simple means the aforementioned drawbacks and shortcomings encountered in the prior art constructions.

Another object of the present invention resides in a supercharged internal combustion engine in which adequate lubrication is assured for the inlet valves to prevent undue wear thereof.

A further object of the present invention is the reduction of the unusually large wear heretofore encountered at the inlet valves and inlet valve seats in internal combustion engines utilizing a supercharger.

Still another object of the present invention resides in a lubricating system for lubricating the valve and/or valve seats of the inlet valves in supercharged internal combustion engines which is simple in construction, reliable in operation, and extremely effective to provide adequate lubrication in those places requiring the same.

Brief description of the drawing

These and other objects, features and advantages of the present invention will become more obvious from the following description when taken in cnnection with the accompaying drawing which shows, for purposes of illustration only, several embodiments in accordance with the present invention and wherein.

Detailed description of the drawing

Figure 1:
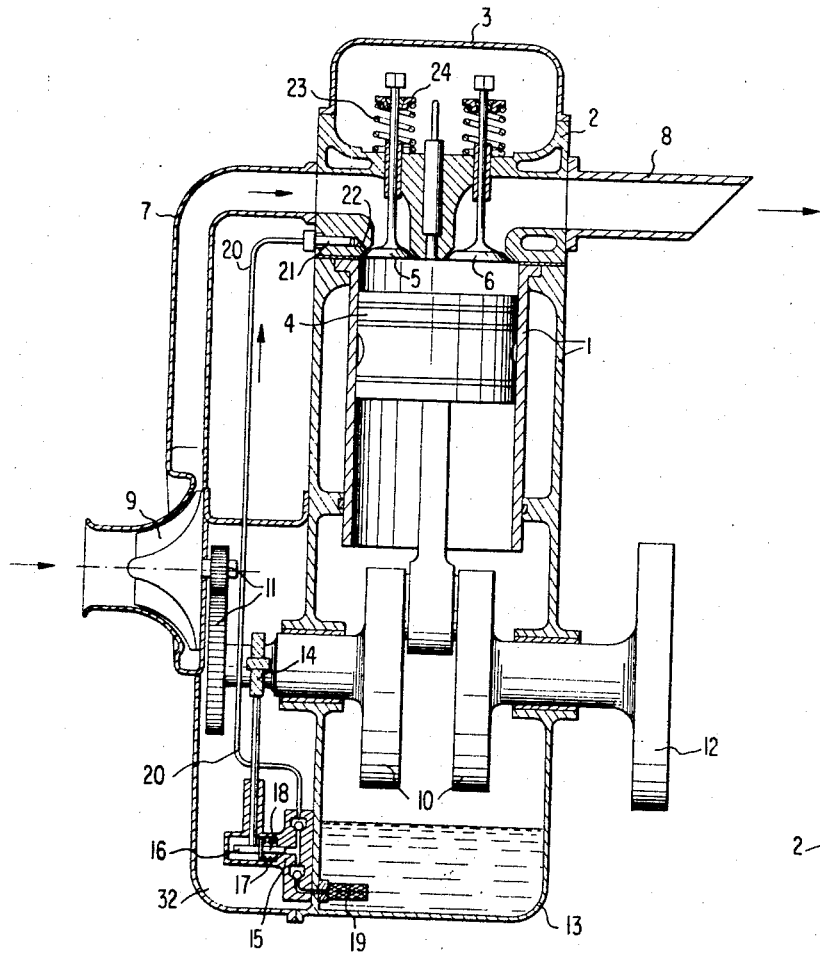
FIGURE 1 is a longitudinal cross-sectional view through an internal combustion engine provided with a supercharger and with an inlet-valve-seat lubricating system in accordance with the present invention.

Referring now to the drawing wherein like reference numerals are used throughout the various views to designate like parts, and more particularly to FIGURE 1, the internal combustion engine illustrated therein comprises at least one internal combustion engine cylinder 1, a cylinder head 2, a cover hood 3 for the cylinder head 2, a working piston 4 sliding within the cylinder 1, inlet and outlet poppet valves 5 and 6, an air inlet channel 7, an exhaust channel 8, a conventional supercharger 9, a crankshaft 10 provided with a supercharger drive means 11, a flywheel 12 and a crankcase or oil pan 13 for the engine. The parts so far described are of any conventional construction.

Figure 2:
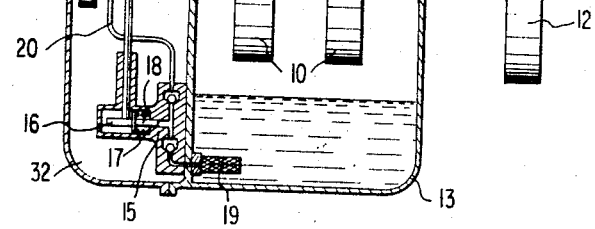
FIGURE 2 is a partial cross-sectional view, on an enlarged scale, illustrating the valve seat lubrication system of FIGURE 1.

According to the present invention, a second drive, for example, a worm drive 14 for a small oil pump 15 is provided in addition to and adjacent the supercharger drive 11 at the cranksshaft 10. The oil pump 15 consists, for example, of a pump plunger 18 actuated by a cam 16 against the effect of a return spring 17. A fine filter 19 is arranged in front or upstream of the suction line of this pump 15. The oil-pump pressure line 20 leads to a nozzle 21 in the cylinder head 2 which supplies the pressure oil to a channel 22 inclined in the direction toward the valve seat surfaces of the inlet valve 5; the pressure oil, after leaving the inclined channel 22, then makes its appearance at the valve seat surfaces as shown in FIGURE 2. If one holds fast the valve spring 23 at the lower end thereof which is seated on the top side of the cylinder head 2, and if one permits the upper spring end to abut freely against the spring disc 24 of the valve stem, then the valve carries out a slight rotation as a result of the stressing of the spring occurring during its opening movement with the consequence that in due time the entire seating surface that the valve disc moves past the bore 22 and is thereby wetting with oil that, in turn, also reaches thereby the counter-seating surfaces of the valve seat. However, any other known means for rotating the valve during its opening and/or closing movement may be provided in lieu thereof.

Figure 3:
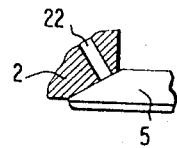
FIGURE 3 is a partial cross-sectional view, similar to FIGURE 2, illustraitng a modified embodiment of a valve seat lubrication system in accordance with the present invention provided with a lubricant distributor groove in the valve-seat-ring.
Figure 5:
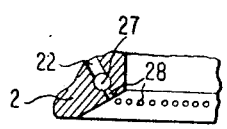
FIGURE 5 is a partial cross-sectional view, similar to FIGURES 2, 3, and 4, illustrating still another modified embodiment of a valve seat lubrication system in accordance with the present invention, utilizing radial lubricating bores branching off from an annular channel.
Figure 4:
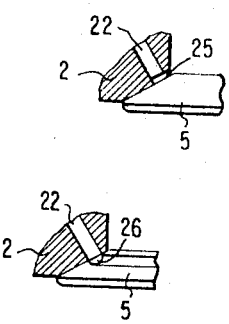
FIGURE 4 is a partial cross-sectional view, similar to FIGURES 2 and 3, illustrating a still further modified embodiment of a valve seat lubrication system in accordance with the present invention, provided with a lubricant distributor groove in the valve disc.

Furthermore, within the scope of the present invention, one may take care beforehand for an intensive distribution of the lubricant at the seating surfaces in that one provides, for example, according to FIGURE 3, an annular groove 25 at the valve seat ring of the cylinder head 2, or according to FIGURE 4, an annular groove 26 for the reception and distribution of the lubricant at the valve disc.

Figure 6:
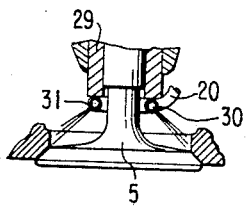
FIGURE 6 is a partial cross-sectioal view through still a further modified embodiment of a valve seat lubricating system in accordance with the present invention, utilizing a spray ring arranged in the air inlet duct upstream of the valve.

In the embodiment according to FIGURE 6, the pressure oil line 22 terminates in an annular channel 27 surrounding the valve seat from which a series of fine lubricant bores 28 terminate at the valve seat surfaces.

In the embodiment acocrding to FIGURE 6, the pressure oil line 20 terminates directly above the valve seat surfaces, for example, below the valve plunger guide bushing 29 in a single spray nozzle 30 or in a spray ring 31 which injects the lubricant in one or several jets or also in conical shape uniformly over the seating surface circumference.

The lubricant pump 15 together with its drive 14, 16, 17, 18 is accommodated together with the supercharger drive 11 in a separate chamber 32 disposed adjacent the crankcase 13 of the internal combustion engine.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A lubricating system for lubricating the inlet valves of supercharged internal combustion engines equipped with poppet valves to minimize the wear thereof, comprising an inlet poppet valve having valve seat surfaces, a supercharger for pressurizing the inlet charge, first means for effectively supplying a lubricant directly to the valve seat surfaces substantially independent of the inlet charge, and second means operatively connected with said first means for providing a supply of lubricant during operation of the engine.

2. The combination according to claim 1, wherein said first means includes discharge means for spraying the lubricant against the valve seat surfaces.

3. The combination according to claim 1, wherein said first means includes lubricant channel means terminating in the valve seat surfaces.

4. The combination according to claim 2, wherein said second means is operable to cause the lubricant to leave said lubricant channels under pressure.

5. The combination according to claim 1, wherein said first means includes means for wetting the valve seat surfaces at least in one place with lubricant, and means for imparting a rotary movement to the inlet valve during reciprocating movements thereof.

6. The combination according to claim 1, wherein said first means includes means uniformly distributing the lubricant over the valve seat surfaces.

7. The combination according to claim 1, wherein said second means supplies engine lubricant to said first means.

8. The combination according to claim 1, wherein the engine includes an oil sump and a crankshaft, and wherein said second means includes an oil pump driven by said crankshaft and provided with a pressure line leading to said first means.

9. The combination according to claim 8, wherein said first means includes annular groove means distributing the lubricant and provided in the seat surfaces of one of the two parts consisting of the valve seat ring and of the valve disc of the inlet valve.

10. The combination according to claim 8, wherein said first means includes an annular channel and, a relatively large number of radial bores branching off from said annular channel and terminating at the seat surfaces, and wherein said lubricant pressure line terminates in said annular channel.

11. The combination according to claim 8, wherein said first means includes injection nozzle means located at a distance upstream of the inlet valves, said lubricant pressure line terminating in said injection nozzle means.

12. The combination according to claim 11, wherein said injection nozzle means includes at least one nozzle directed against the valve seat surfaces.

13. The combination according to claim 11, wherein the injection nozzle means includes an injection ring provided with injection apertures directed against the seat surfaces.

14. The combination according to claim 8, wherein the oil pump together with its drive means located between the crankshaft and the supercharger drive means are arranged together with said supercharger drive means in a separate chamber of the internal combustion engine.

15. The combination according to claim 14, wherein the drive means for the lubricating pump includes worm drive means which actuates by way of a cam a pump plunger under the influence of a return spring.

16. The combination according to claim 15, wherein said oil pump includes a suction line provided with fine filter means.

17. The combination according to claim 8, wherein the drive means for the lubricating pump includes worm drive means which actuates by way of a cam a pump plunger under the influence of a return spring.

18. The combination according to claim 8, wherein said oil pump includes a suction line provided with fine filter means.

19. The combination according to claim 3, wherein said second means supplies engine lubricant to said first means.

20. The combination according to claim 5, wherein said second means supplies engine lubricant to said first means.

21. The combination according to claim 6, wherein said second means supplies engine lubricant to said first means.

References Cited

UNITED STATES PATENTS 2,526,450  10/1950  Aspin.

HOUSTON S. BELL, JR., *Primary Examiner.*

U.S. Cl. X.R.

123—196